April 21, 1936.  G. P. LUCKEY  2,037,729
METHOD AND MEANS FOR ELIMINATING ERROR IN TIMEPIECES
Filed Aug. 29, 1933
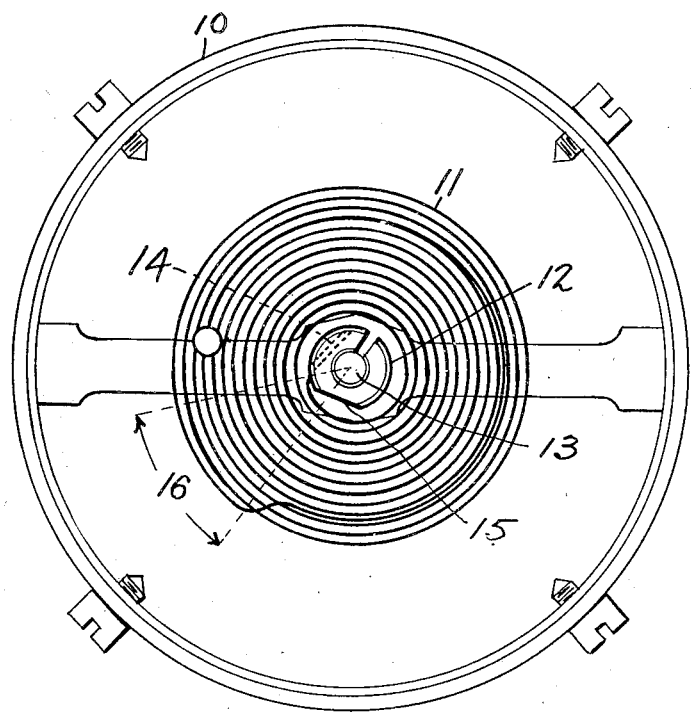

Patented Apr. 21, 1936

2,037,729

UNITED STATES PATENT OFFICE 2,037,729

METHOD AND MEANS FOR ELIMINATING ERROR IN TIMEPIECES

George P. Luckey, Lancaster, Pa., assignor to Hamilton Watch Company, Lancaster, Pa., a corporation of Pennsylvania Application August 29, 1933, Serial No. 687,358

10 Claims. (Cl. 58—115)

In timing devices having a balance wheel and hairspring, variation or irregularity in time occurs when the time piece is placed in various positions with the balance staff axis in a horizontal plane. Such time variation is known as position error. Theoretically and experimentally such error is shown to be contributed to by a want of poise of the balance wheel. If it is not perfectly poised, gravity acting upon it because of its unbalanced state, will accelerate or retard its motion and thus change its period of oscillation. The amount of period change depends on the moment of the unpoised or eccentrically located weight, the amplitude of motion of the wheel and the position of the unpoised weight relative to the remainder of the balance wheel.

Striving for the greatest possible accuracy in time pieces and especially those subject to position error, tests have shown that even when the balance wheel, the balance staff and its attendant parts were as perfectly poised as possible, there still existed or remained position error. According to the usual or customary procedure in watch-making, the balance wheel and its attendant parts are assembled as one unit. The hairspring is assembled as another unit, its inner end and the customary collet are pinned together and a stud is fastened to the outer end of the hairspring for the rigid attachment thereof to the balance cock. The collet has a friction fit on the balance staff, and it is provided with a radial slot to place spring tension therein to assure that it will hold tightly to the balance staff and also to enable the application of a tool to the collet to rotate it upon the balance staff to place the watch "in beat". The balance wheel unit may be and is carefully poised, but the hairspring unit is incapable of being poised because of its flexibility although the hairspring is trued so that the center of oscillation is in the center of the spiral and the hairspring coils all lie in the same plane except the outer terminal, if one is used. The outer end of the spiral in case an outer terminal is used, is so curved that the hairspring will coil and uncoil uniformly during the oscillation of the balance wheel. The collet slot and the pin method of attaching the hairspring to the collet throw the customary collet out of poise and tests showed that this want of poise had an effect on position error. However, tests with a poised collet in an assembly that included a poised balance wheel and a true hairspring showed the existence or presence of position error.

I found this persisting position error which my tests revealed, should be referred in all cases to the inner or pinning point of the hairspring to the collet and the indications were that it might be due to an out of poise condition in the inner coils of the hairspring. It appeared to be largely independent of the shape of the hairspring whether or not inner or outer terminals were used. Tests showed that this persisting position error could be eliminated to a large extent by compensating want of poise of balance wheel unit or collet by throwing the balance wheel unit or the collet out of poise a proper amount and in the proper direction or by throwing the center of the hairspring out of the center of oscillation to a proper amount and in the necessary direction. As such position error was tied up with the hairspring that might be moved relative to the balance wheel unit and since the balance wheel unit should be as perfectly poised as possible, it is not desirable to correct for this error by throwing the balance wheel unit out of poise. Since the hairspring center should be in the center of oscillation and it is difficult to throw it out of center the right amount in the right direction, I found it desirable not to seek the remedy for such position error by dealing with the hairspring. Study of tests showed that apparently the error-causing out of poise was located near the collet and bore a definite relationship to the point where the inner end of the hairspring is pinned to the collet. I conceived the idea that by dealing with the collet, this persisting or residual position error might be cured.

Following up my conception of utilizing the hairspring collet to remedy position error, I have produced a collet that eliminates position error, without altering the essential characteristics of the collet, such as its mode of attachment to the balance staff, and have invented a method of effecting such poising. In brief, I have found that the major portion of the heretofore persisting or residual position error can be eliminated by so forming or shaping the collet that it is poised when a compensating device, such as a short, angular portion or length of hairspring is attached thereto. The length of this compensating or poising portion of the hairspring is largely independent of the size of the hairspring and balance wheel. The proper amount of hairspring for poising may be determined thus:—

In testing for the location of the out-of-poise weight a time piece fitted with a poised balance wheel and a true hairspring (center of spiral in center of oscillation) of the type to be used in this time piece in production, is rated in say twelve equally spaced angular positions with the balance staff horizontal. The number of positions timed is largely a matter of choice and can be varied as long as sufficient observations are taken to determine variation in rate as the time piece is rotated to different positions about the balance staff. The motion of the balance wheel is held constant at less than one turn (180° to right and left of zero position). Three-quarters of a turn motion of the balance wheel (135° to right and 135° to left of zero position) is usually chosen for the test. At this amount of motion if any part of the balance wheel-hairspring assembly is out of poise, the rate observed will be fastest in the position in which the out of poise part or weight is down when the balance wheel is at rest and slowest in the position in which this out of poise weight is up. In this manner, the position of any out of poise weight can be determined and by making compensating weight changes of the balance wheel or collet, the out of poise state can be brought to the minimum, in which case the differences in rate as the time piece is rotated about the horizontal balance staff should be very small or zero.

When this has been accomplished the balance wheel-hair-spring assembly can be considered poised. This assembly is removed from the time piece, placed on poising calipers and all except the inner half turn of the hairspring is cut off. The portion of the hairspring remaining on the collet is now cut off a little at a time until the balance wheel with the collet and the portion of the hairspring remaining fastened to it are in perfect poise. This remaining portion of the hairspring then gives the amount that a perfectly poised balance wheel with its staff and attendant parts and the collet must be thrown out of poise to correct an apparent out of poise in the hairspring itself. This out of poise error in the hairspring can be corrected by using in connection with a perfectly poised balance and its attendant parts a collet which itself is thrown out of poise by an amount equal to this predetermined amount of hairspring. Because of slight variations from watch to watch the design of the collet for any particular type of time piece is best determined by the average of several tests.

Series of tests have been made on watch movements varying from 16 size to 21/0 size and in these it has been found that the amount of hairspring which should be fastened to the collet when it is poised to correct for the residual position error in the hairspring was in all cases between 14° and 63° of arc of the innermost turn of the hairspring, and the average for different sizes was between 29° and 44° of arc.

In the drawing:

The figure is an enlarged plan view of a balance wheel and hairspring assembly exemplifying my invention.

Describing what is shown in such drawing, the balance wheel is designated 10, the hairspring 11, the slotted collet 12, and the balance staff 13. The inner end of the hairspring is secured to the collet by a driven pin 14, passing with a contiguous portion of the hairspring through an obliquely extended opening or hole in the collet. The collet on the side opposite the point where the hairspring leaves the collet is weighted so that it will poise the unit on a poising tool when the predetermined piece of hairspring is attached to the collet side opposite such weight. That unpoising weight may be provided by removal at 15 of a proper portion of metal from the collet at the necessary point. The angular arc corresponding to the length of the piece of hairspring is designated 16.

Having, in accordance with the statute, described and shown what I now consider a very satisfactory embodiment of my invention, it is proper to state that my invention consists in whatever is described by or is included within the terms or scope of the appended claims.

What I claim is:

1. A time piece controlling mechanism comprising a balance wheel having a staff, a hairspring and a collet on said staff, said collet being out of poise by weight on the side substantially opposite the point of attachment of the hairspring thereto, the out of poise of the collet being compensated by a portion of the hairspring adjacent its point of attachment to the collet.

2. A time piece controlling mechanism comprising a balance wheel having a staff, a hairspring and a collet on said staff, said collet being out of poise by weight on the side substantially opposite the point of attachment of the hairspring thereto, the balance wheel being poised and the hairspring having the center of its coils coincident with the center of oscillation.

3. A time piece controlling mechanism comprising a balance wheel having a staff, a hairspring and a collet on said staff, said collet being out of poise by weight substantially opposite the place of attachment of the hairspring thereto, and which is in poise when a compensating element, such as a predetermined length of hairspring is attached to the collet and the balance wheel being poised and the hairspring having the center of its coils coincident with the center of oscillation.

4. A time piece controlling mechanism as in claim 3, when the compensating element is substantially the first tenth of a turn of the inner coil of the hairspring.

5. A method of constructing time pieces having a balance wheel and a hairspring to eliminate position errors that includes the acts of rating a time piece with the balance wheel and collet poised and the hairspring with the center of its coils coincident with the center of oscillation serving as a standard in various angular positions with the wheel axis extending horizontally, noting the place in the balance wheel-hairspring assembly where there is unbalanced weight eliminating the unbalanced weight, thereafter removing all of the hairspring except substantially the inner half turn, then removing such portions of the hairspring that remain until the assembly is in poise and then using the portion that is left of the hairspring as a measure for determining the extent to throw out of poise a member of the assembly to eliminate position error of such time piece.

6. A method of constructing time pieces having a balance wheel and a hairspring to eliminate position errors that includes the acts of rating a time piece with the balance wheel and collet poised and the hairspring with the center of its coils coincident with the center of oscillation serving as a standard in various angular positions with the wheel axis extending horizontally, noting the place in the balance wheel-hairspring assembly where there is unbalanced weight eliminating the unbalanced weight, thereafter removing portions of the hairspring until a part remains that results in poising, and then using the portion that is left of the hairspring as a measure for determining the extent to throw out of poise a member of the assembly to eliminate position error of such time piece, in which the assembly is to be installed.

7. A method of constructing time pieces having a balance wheel and a hairspring to eliminate position errors that includes the acts of rating a time piece with the balance wheel and collet poised and the hairspring with the center of its coils coincident with the center of oscillation serving as a standard in various angular positions with the wheel axis extending horizontally, noting the place in the balance wheel-hairspring assembly where there is unbalanced weight eliminating the unbalanced weight, thereafter removing portions of the hairspring until a part remains that results in poising, and then using the portion that is left of the hairspring as a measure for compensating alteration in a time piece balance wheel-hairspring assembly to eliminate position error of such time piece, in which the assembly is to be installed.

8. A method of constructing time pieces having a balance wheel and a hairspring to eliminate position errors that includes the acts of rating a time piece serving as a standard, in various angular positions with the wheel axis extending horizontally, noting the place in the balance wheel-hairspring assembly where there is eccentric weight, correcting the want of poise due to the noted eccentric weight by removal of a portion of the hairspring or by correspondingly unpoising the collet to provide, and a standard for measurement of compensating weight addition to a time piece balance wheel-hairspring assembly that eliminates position error of such time pieces.

9. A method of determining the form of a hairspring collet to eliminate position error in a balance wheel-hairspring assembly, which includes the step of providing the collet with a preponderance of weight on the side opposite the place of attachment of the hairspring that is counterbalanced by a weight such as a predetermined length of hairspring attached to the collet.

10. A balance wheel-hairspring assembly comprising a balance wheel, staff, collet and hairspring, the collet being out of poise by a weight substantially opposite the place of attachment of the hairspring thereto, the weight of the portion of the hairspring contiguous to its point of attachment to the collet being such as to compensate for the unbalanced distribution of the collet weight.

GEORGE P. LUCKEY.